(12) United States Patent
Kim et al.

(10) Patent No.: US 8,233,236 B2
(45) Date of Patent: Jul. 31, 2012

(54) MAGNETIC WRITE HEAD WITH SIDE SHIELD AND GAP LAYER

(75) Inventors: Yong-su Kim, Seoul (KR); Kook-hyun Sunwoo, Hwaseong-si (KR); Kyoung-won Na, Seoul (KR)

(73) Assignee: Seagate Technology International, Scotts Valley, CA (US)

( * ) Notice: Subject to any disclaimer, the term of this patent is extended or adjusted under 35 U.S.C. 154(b) by 1057 days.

(21) Appl. No.: 12/169,291

(22) Filed: Jul. 8, 2008

(65) Prior Publication Data

US 2009/0122449 A1 May 14, 2009

(30) Foreign Application Priority Data

Nov. 8, 2007 (KR) .................. 10-2007-0113721

(51) Int. Cl.
*G11B 5/127* (2006.01)
(52) U.S. Cl. .................. 360/125.3; 360/125.16
(58) Field of Classification Search ............. 360/125.16, 360/125.3, 125.03, 125.08, 125.09, 125.12, 360/125.13
See application file for complete search history.

(56) References Cited

U.S. PATENT DOCUMENTS

| | | | | |
|---|---|---|---|---|
| 7,002,775 B2 * | 2/2006 | Hsu et al. | ................. | 360/125.03 |
| 7,042,682 B2 * | 5/2006 | Hu et al. | ........................ | 360/317 |
| 7,289,295 B2 * | 10/2007 | Guan et al. | ............... | 360/125.17 |
| 7,804,666 B2 * | 9/2010 | Guan et al. | ..................... | 360/319 |
| 8,023,231 B2 * | 9/2011 | Guan et al. | ..................... | 360/319 |
| 8,035,930 B2 * | 10/2011 | Takano et al. | ................. | 360/319 |
| 2002/0071208 A1 * | 6/2002 | Batra et al. | .................... | 360/125 |

* cited by examiner

*Primary Examiner* — Jefferson Evans

(57) ABSTRACT

A magnetic write head includes a main pole, a return yoke forming a magnetic path with the main pole, a side shield formed at both sides of the main pole, and a shield gap layer formed between the side shield and the return yoke. The side shield and the return yoke have portions connected to each, and are separated from each other by the shield gap layer in an area except for the portions which contact. A first gap layer formed of a nonmagnetic insulation material is formed between both sides of the main pole and the side shield. A gap is formed between an end portion of the main pole and an end portion of the return yoke and a second gap layer is formed in the gap with a nonmagnetic insulation material.

17 Claims, 7 Drawing Sheets

MAGNETIC WRITE HEAD WITH SIDE SHIELD AND GAP LAYER

CROSS-REFERENCE TO RELATED PATENT APPLICATIONS

This application priority from Korean Patent Application No. 10-2007-0113721, filed on Nov. 8, 2007 in the Korean Intellectual Property Office, the disclosure of which is incorporated herein in its entirety by reference.

BACKGROUND OF THE INVENTION

1. Field of the Invention

The present invention relates to a magnetic write head, and more particularly, to a magnetic write head having a structure in which a main pole is surrounded by a side shield, and a method of manufacturing the magnetic write head.

2. Description of the Related Art

With the advent of industrialization and an information-oriented society, the amount of information handled by individuals or organizations has sharply increased. It is possible to access the Internet where various kinds of information can be obtained. Also, computers with a fast data processing speed and a large data storing capacity have been widely distributed. Central processing unit (CPU) chips and computer peripheral devices are continuously improved to increase the data processing speed of the computer. To improve the data storing capacity, a variety of information storing media, for example, hard disks, need to be highly densified.

Recently, a variety of recording media have been introduced to meet these needs. Most recording media are magnetic recording media using a magnetic layer as a data recording layer, and such magnetic recording media can be classified into a horizontal magnetic recording method and a vertical magnetic recording method according to a data recording method.

The horizontal magnetic recording method is used to record data such that the magnetization direction of a magnetic layer is aligned parallel to the surface of the magnetic layer. The vertical magnetic recording method is used to record data such that the magnetization direction of a magnetic layer is aligned perpendicular to the surface of the magnetic layer. The vertical magnetic recording method is much more advantageous as compared to the horizontal magnetic recording method in view of the data recording density.

In a magnetic write head using the vertical magnetic recording method, to increase a recording density, it is important to improve a track density and a linear recording density. In order to improve the linear recording density, a magnetic field gradient of a magnetic write head needs to be increased. To this end, a recording medium having a dual layer structure in which a lower portion of the recording medium is coated with a soft magnetic underlayer is used. However, to achieve a recording density greater than 200 Gb/in$^2$, a larger magnetic field gradient is needed. To improve the track density, a track width of a magnetic write head needs to be manufactured more accurately. However, it is a problem since an effective track width substantially recorded on the recording medium increases as compared to a geometric track width designed on the magnetic write head.

To address the above-described problem, a magnetic write head having a structure in which a wrap around shield is formed around a main pole has been developed. The wrap around shield has a merit in that the effective track width is decreased by increasing the magnetic field gradient in a track width direction, that is, a cross track direction. However, for the wrap around shield, paths through which the magnetic flux of the main pole leaks toward a return yoke are diverse so that a magnetic flux density in a trailing edge of the main pole decreases. Thus, a linear recording density in a track following direction, that is, a downtrack direction, is decreased.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a magnetic write head having a structure in which a main pole is surrounded by a side shield, and a method of manufacturing the magnetic write head.

According to an aspect of the present invention, a magnetic write head comprises a main pole, a return yoke forming a magnetic path with the main pole, a side shield formed at both sides of the main pole, and a shield gap layer formed between the side shield and the return yoke.

The side shield and the return yoke are connected to each other through a section of contact between the side shield and the return yoke, and are separated from each other by the shield gap layer in an area except for the section of contact.

The side shield has a thickness thinner than the shield gap layer.

A first gap layer is formed between both sides of the main pole and the side shield with a nonmagnetic insulation material.

A gap is formed between an end portion of the main pole and an end portion of the return yoke, and a second gap layer is formed in the gap with a nonmagnetic insulation material.

The main pole, the return yoke, and the side shield are formed of a magnetic material.

The shield gap layer is formed of a nonmagnetic insulation material.

According to another aspect of the present invention, a method of manufacturing a magnetic write head comprises forming a first gap layer on a substrate, a main pole arranged between the first gap layer, and a second gap layer arranged on an upper surface of the main pole, forming a side shield on the first gap layer such that the side shield is at both sides of the main pole, and the first gap layer is interposed between the main pole and the side shield, forming a shield gap layer on the side shield, and forming a return yoke on the shield gap layer and the second gap layer.

The side shield and the return yoke are connected to each other through a section of contact between the side shield and the return yoke, and are separated from each other by the shield gap layer in an area except for the section of contact.

The side shield has a thickness thinner than the shield gap layer.

The forming of the first gap layer on the substrate, the main pole arranged between the first gap layer, and the second gap layer arranged on an upper surface of the main pole comprises forming a first nonmagnetic insulation material layer by coating the substrate with a nonmagnetic insulation material, forming the first gap layer having inclined side surfaces and extending parallel to each other with a predetermined gap between the first gap layers by patterning the first nonmagnetic insulation material layer, grinding the surface of the first magnetic material layer to be flat using a chemical mechanical polishing process until upper end portions of the first gap layer are exposed, forming a second nonmagnetic insulation material layer by coating the surface of the first magnetic material layer and the exposed surfaces of the first gap layer with a nonmagnetic insulation material, and forming the second gap layer and the main pole by patterning the second nonmagnetic insulation material layer and the first magnetic material layer.

The nonmagnetic insulation material is any one of the materials selected from the group consisting of $Al_2O_3$, $SiO_2$, and $Si_3N_4$.

In the forming of the first magnetic material layer, after a first seed layer is formed on the surfaces of the substrate and the first gap layer, the first seed layer is coated with a magnetic material in order to form the first magnetic material layer.

The first seed layer and the first magnetic material layer are formed of a soft magnetic material such as NiFe or NiCoFe.

In the forming of a side shield at both sides of the main pole, after a second seed layer is formed on the surfaces of the substrate, the first gap layer, and the second gap layer, the second seed layer is plated with a magnetic material to a predetermined thickness in order to form the side shield.

The second seed layer and the side shield are formed of a soft magnetic material such as NiFe or NiCoFe.

The forming of a shield gap layer on the side shield comprises forming a third nonmagnetic insulation material layer by coating the surface of the side shield with a nonmagnetic insulation material, and forming the shield gap layer formed of the remaining third nonmagnetic insulation material layer, by grinding the surface of the third nonmagnetic insulation material layer to be flat using a chemical mechanical polishing process until the section of the side shield and the second gap layer are exposed.

In the forming of a return yoke on the shield gap layer and the second gap layer, the return yoke connected to the section of the side shield is formed by coating a magnetic material on the exposed section of the side shield, the exposed surface of the second gap layer, and the surface of the shield gap layer.

The nonmagnetic insulation material is any one of the materials selected from the group consisting of $Al_2O_3$, $SiO_2$, and $Si_3N_4$, and the magnetic material is a soft magnetic material such as NiFe or NiCoFe.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Figure 1:
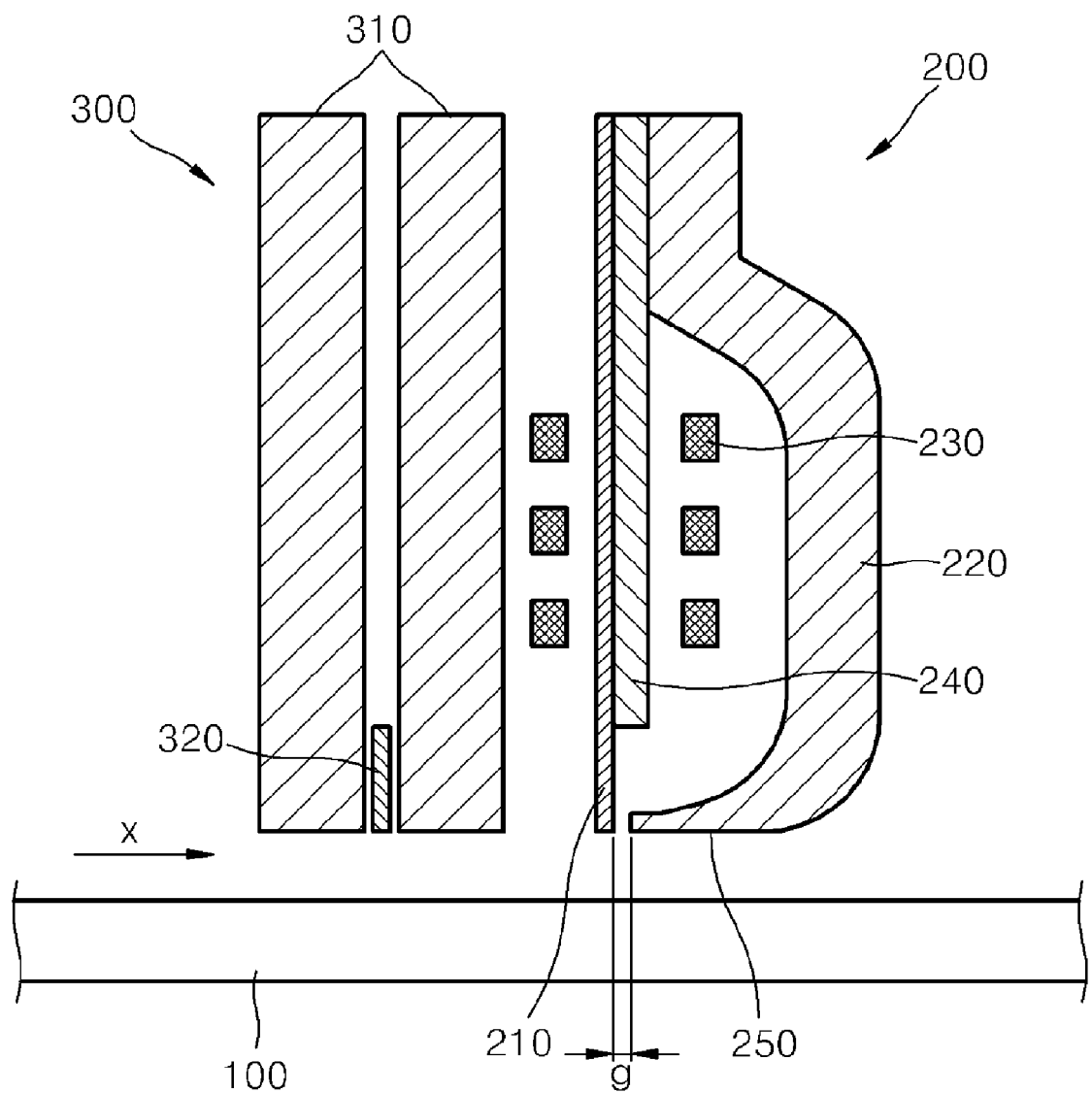
FIG. 1 is a vertical cross-sectional view of a magnetic recording apparatus having a magnetic write head, according to an exemplary embodiment of the present invention.

Hereinafter, a magnetic write head according to an exemplary embodiment of the present invention will be described in detail with reference to the accompanying drawings. In the drawings, like reference numerals denote like constituent elements.

FIG. 1 is a vertical cross-sectional view of a magnetic recording apparatus having a magnetic write head, according to an exemplary embodiment of the present invention. Referring to FIG. 1, the magnetic recording apparatus includes a magnetic recording medium 100, a magnetic write head 200 for writing information to the magnetic recording medium 100, and a read head 300 for reproducing information recorded on the magnetic recording medium 100.

The magnetic write head 200 writes information along a track formed on the magnetic recording medium 100 that moves in a direction X. The magnetic write head 200 includes a main pole 210, a return yoke 220, and an induction coil 230. The induction coil 230 generates a magnetic field, and the main pole 210 and the return yoke 220 form a magnetic path of a magnetic field generated by the induction coil 230. A sub-yoke 240 may be arranged at a side of the main pole 210 to help concentrate the magnetic flux at an end portion of the main pole 210.

The read head 300 has a magnetoresistance element 320 that is arranged between magnetic shield layers 310 in order to shield magnetic noise generated from the periphery of the read head 300. Surfaces of the magnetic recording head 200 and the read head 300 facing the magnetic recording medium 100 are defined as an air bearing surface (ABS) 250.

Figure 2:
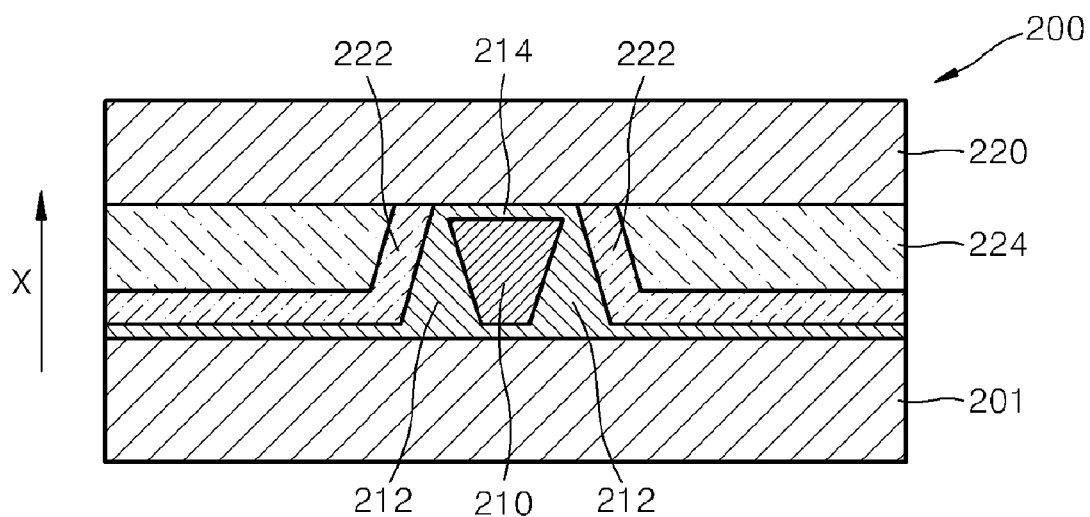
FIG. 2 is a plan view of the magnetic write head of FIG. 1 as viewed from an air bearing surface.

FIG. 2 is a plan view of the magnetic write head of FIG. 1 as viewed from the ABS 250. Referring to both of FIGS. 1 and 2, the magnetic write head 200, according to the present exemplary embodiment, includes the main pole 210, the return yoke 220, a shell type side shield 222, and a shield gap layer 224.

The magnetic write head 200, configured as above, is formed on a substrate 201 that functions as the magnetic shield layers 310 of the read head 300 of FIG. 1. The substrate 201 may be formed of $Al_2O_3$—TiC.

The main pole 210 and the return yoke 220 both form a magnetic path of a magnetic field as described above, and can be formed of a soft magnetic material having a low coercivity, a high saturated magnetization value, and high permeability. The soft magnetic material is, for example, NiFe or NiCoFe.

A first gap layer 212 is formed at both sides of the main pole 210. The side surface of the first gap layer 212 can be inclined. Since the first gap layer 212 is formed at both sides of the main pole 210, the first gap layer 212 is referred to as a side gap layer. The first gap layer 212 can be formed of a nonmagnetic insulation material, for example, $Al_2O_3$, $SiO_2$, or $Si_3N_4$.

A predetermined gap g, for leaking a magnetic field toward the magnetic recording medium 100, is formed between the end portion of the main pole 210 and an end portion of the return yoke 220, such that a second gap layer 214 can be formed in the gap g, to connect with the first gap layer 212, so as to surround the main pole 210. Like the first gap layer 212, the second gap layer 214 can be formed of a nonmagnetic insulation material. In general, in the ABS 250, the end portion of the main pole 210, facing a movement direction of the magnetic recording medium 100, that is, a direction X, is referred to as a leading edge while the opposite end of the main pole 210 is referred to as a trailing edge. Thus, the second gap layer 214 can be referred to as a trailing edge gap layer.

The shell type side shield 222 is formed at both sides of the main pole 210 with respect to the first gap layer 212. The shell type side shield 222 is formed to have a sufficiently thin thickness and can be formed of a soft magnetic material like the return yoke 220. The shield gap layer 224 is formed between the shell type side shield 222 and the return yoke 220, and the shield gap layer 224 can be formed of a nonmagnetic insulation material like the first and second gap layers 212 and 214. In detail, the shell type side shield 222 can have a relatively thin thickness, that is, a thickness sufficiently thinner than that of, for example, the shield gap layer 224. Thus, most areas of the shell type side shield 222 and the return yoke 220 are separated from each other by the shield gap layer 224. However, the shell type side shield 222 and the return yoke 220 contact each other in an area having a thickness corresponding to the thickness of the shell type side shield 222. That is, the shell type side shield 222 and the return yoke 220 are connected to each other through an edge surface of the shell type side shield 222, and separated from each other by the shield gap layer 224 in an area except for the connection area.

As described above, by forming the shell type side shield 222 at the sides of the main pole 210, a magnetic field gradient in the widthwise direction of a track, that is, a cross track direction, increases so that the effective track width can be reduced, thereby increasing a track density.

When the shell type side shield 222 is formed having a sufficiently thin thickness, the return yoke 220 and the shell type side shield 222 are connected through an area having a thickness corresponding to the thickness of the shell type side shield 222 so that a path through which the magnetic flux of the main pole 210 leaks toward the return yoke 220 is limited, thereby restricting the leakage of magnetic flux of the main pole 210. Accordingly, a high magnetic flux density can be maintained at the trailing edge of the main pole 210, so that a linear recording density in the track following direction, that is, the down-track direction, can be improved.

FIGS. 3 to 14 are cross-sectional views showing a method of manufacturing the magnetic write head 200 of FIG. 2, according to an exemplary embodiment of the present invention.

Figure 3:
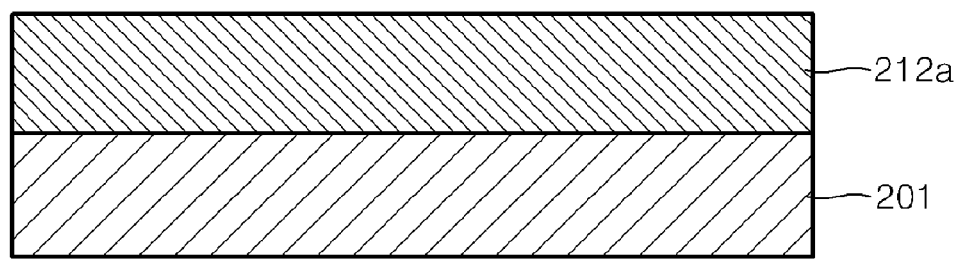
FIGS. 3 to 14 are cross-sectional views showing a manufacturing method of the magnetic write head of FIG. 2, according to an exemplary embodiment of the present invention.

First, referring to FIG. 3, a nonmagnetic insulation material layer 212a is formed by coating the substrate 201 with a nonmagnetic insulation material, for example, $Al_2O_3$, $SiO_2$, or $Si_3N_4$ to a predetermined thickness. An $Al_2O_3$—TiC substrate can be used as the substrate 201.

Figure 4:
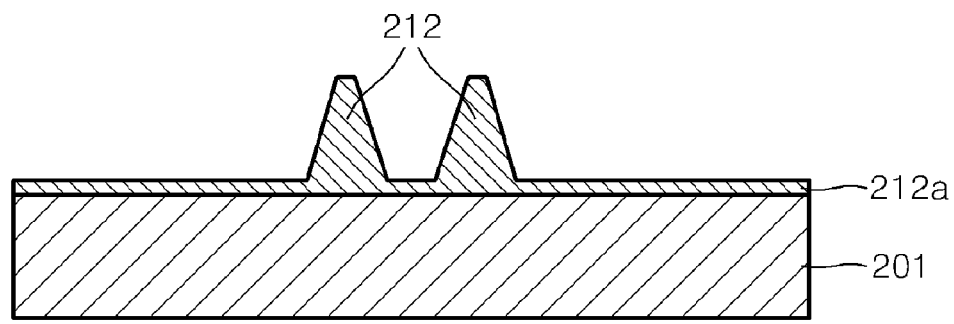

As shown in FIG. 4, the first gap layer 212 having protrusions with inclined side surfaces and extending parallel to each other with a predetermined gap therebetween are formed by patterning the nonmagnetic insulation material layer 212a. The patterning of the nonmagnetic insulation material layer 212a can be performed in a dry or wet etch method using photoresist. The inclination angle of the side surfaces of the first gap layers 212 can be adjusted by controlling the etch speed and time.

The nonmagnetic insulation material layer 212a can be completely removed in an area except for the first gap layers 212 or remain with a slight thickness as shown in FIG. 4.

Figure 5:
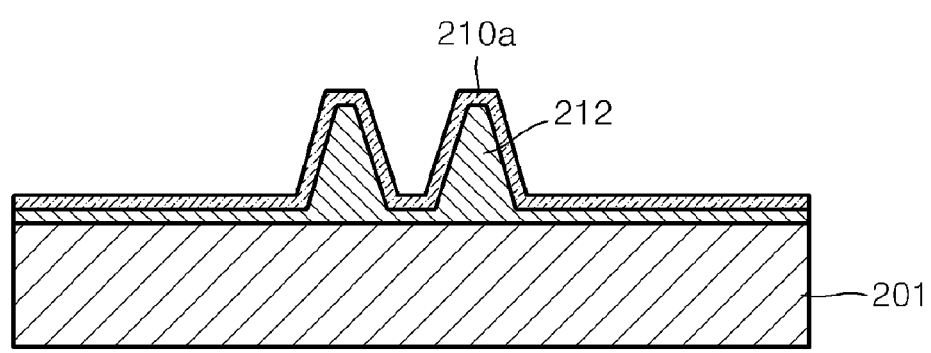

Referring to FIG. 5, a seed layer 210a, for plating, is formed on the surfaces of the substrate 201 and the first gap layer 212 to a predetermined thickness. In detail, the seed layer 210a can be formed of a material that is the same as or similar to a magnetic material to be plated, in a method such as sputtering.

Figure 6:
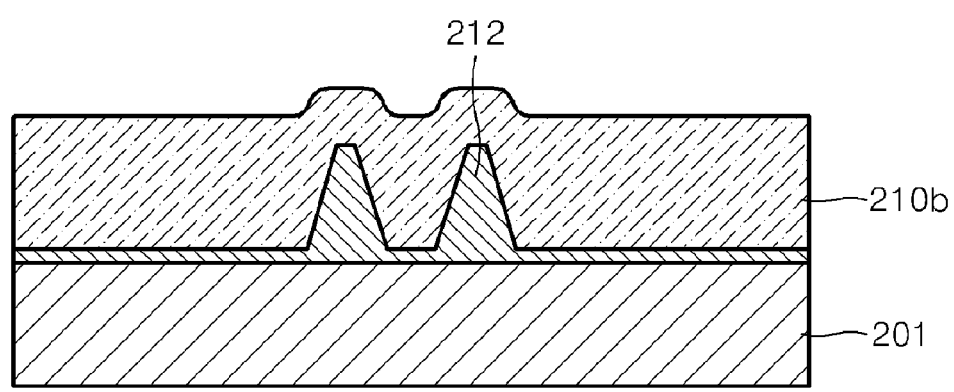

As shown in FIG. 6, a magnetic material layer 210b is formed on the seed layer 210a by plating. In detail, the magnetic material layer 210b can be formed of a soft magnetic material, for example, NiFe or NiCoFe, and the magnetic material layer 210b can be formed to a thickness sufficient to cover the first gap layer 212.

Figure 7:
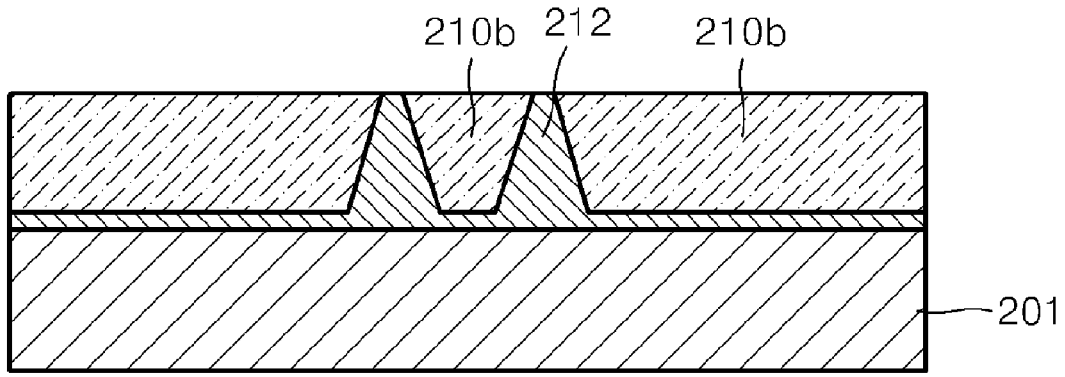
Figure 8:
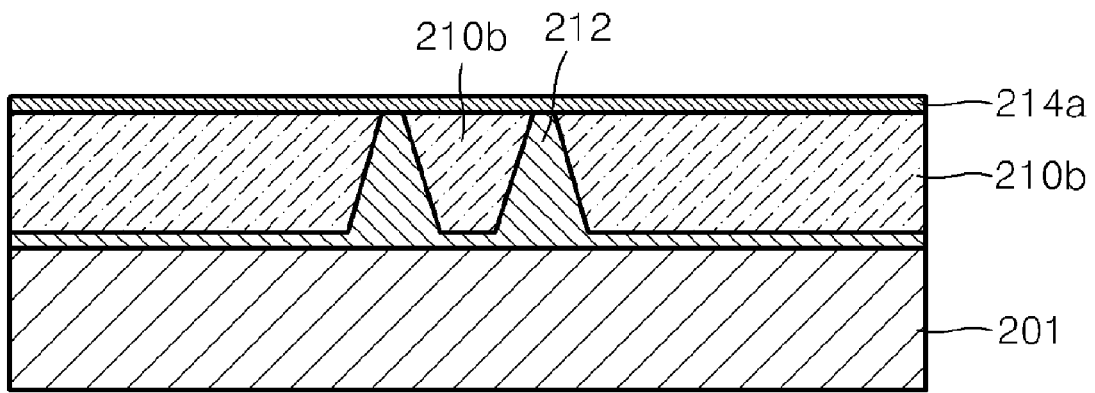
Figure 9:
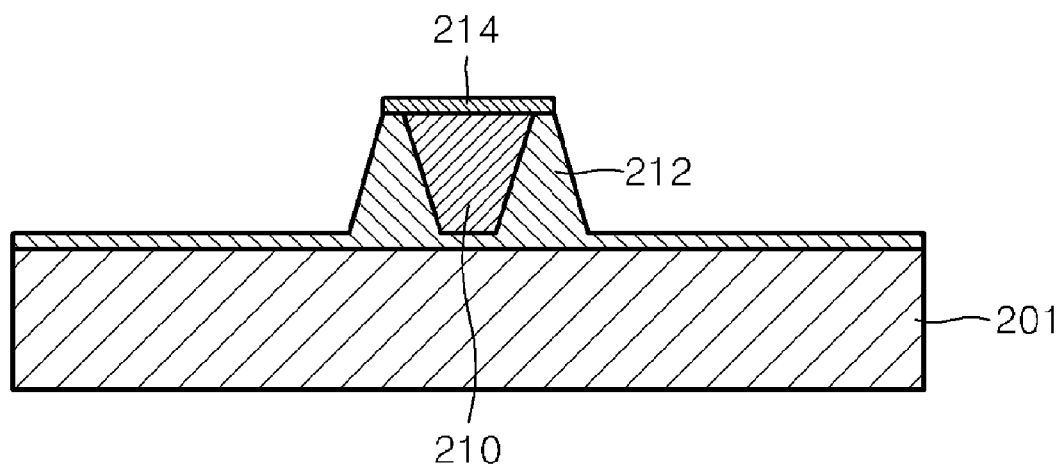

Next, as shown in FIG. 7, the surface of the magnetic material layer 210b is grinded to be flat by using a chemical mechanical polishing (CMP) process until the upper portions of the first gap layer 212 are exposed, thereby reducing the thickness of the magnetic material layer 210b. Referring to FIG. 8, a nonmagnetic insulation material layer 214a is formed by coating the surfaces of the magnetic material layer 210b and the exposed first gap layer 212 with a nonmagnetic insulation material, for example, $Al_2O_3$, $SiO_2$, or $Si_3N_4$, to a predetermined thickness. As shown in FIG. 9, the second gap layer 214 and the main pole 210 are formed by patterning the nonmagnetic insulation material layer 214a and the magnetic material layer 210b by using a dry or wet etching method using photoresist. The patterning process results in forming the main pole 210 as the magnetic material layer 210b that remains between the first gap layer 212 only and the second gap layer 214 as the nonmagnetic insulation material layer 214a that remains only in an area covering an area of the main pole 210 and the first gap layers 212.

Figure 10:
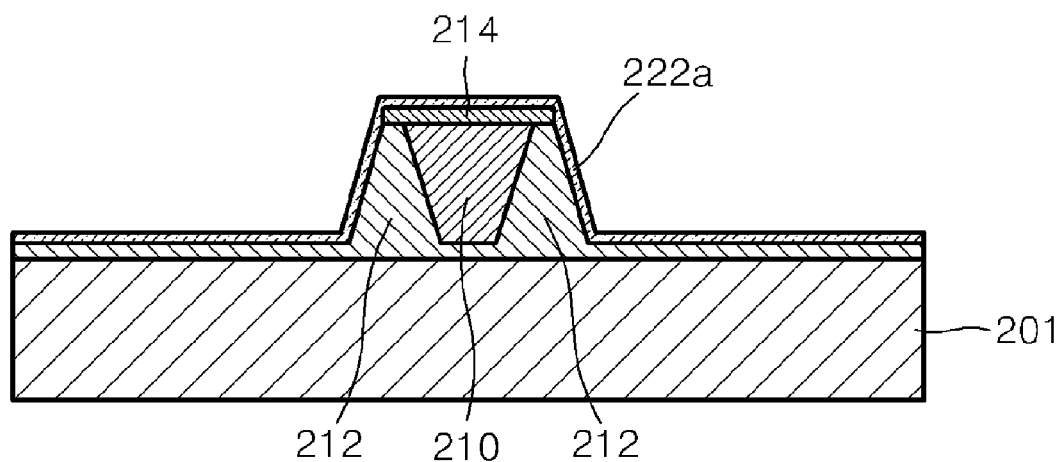

Next, referring to FIG. 10, a seed layer 222a, for plating, is formed to a predetermined thickness on the surfaces of the substrate 201, the first gap layer 212, and the second gap layer 214. In detail, the seed layer 222a can be formed of a material that is the same as or similar to a magnetic material to be plated on the seed layer 222a, in a deposition method such as sputtering.

Figure 11:
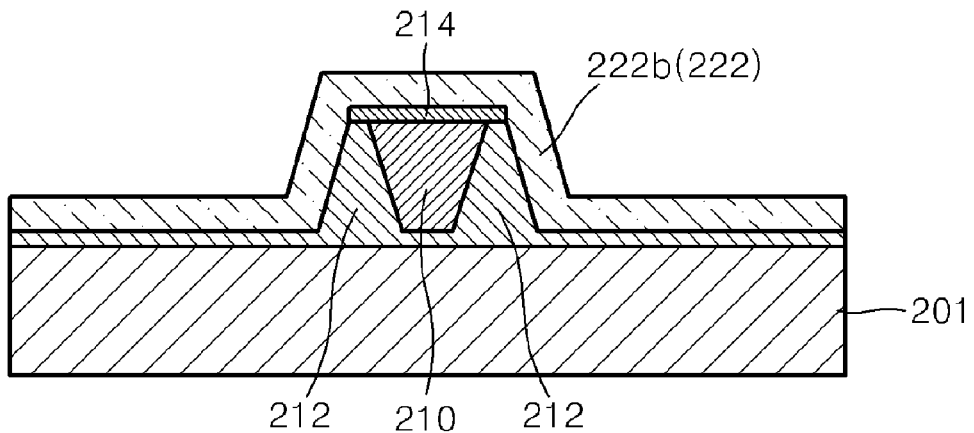

Next, as shown in FIG. 11, a magnetic material layer 222b is formed on the seed layer 222a to a predetermined thickness by plating. In detail, the magnetic material layer 222b can be formed of a soft magnetic material, for example, NiFe or NiCoFe, and the magnetic material layer 222b can be formed to a relatively thin thickness, for example, a thickness sufficiently thinner than the thickness of, for example, the shield gap layer 224 of FIG. 13 as described later. The magnetic material layer 222b is used as the shell type side shield 222.

Figure 12:
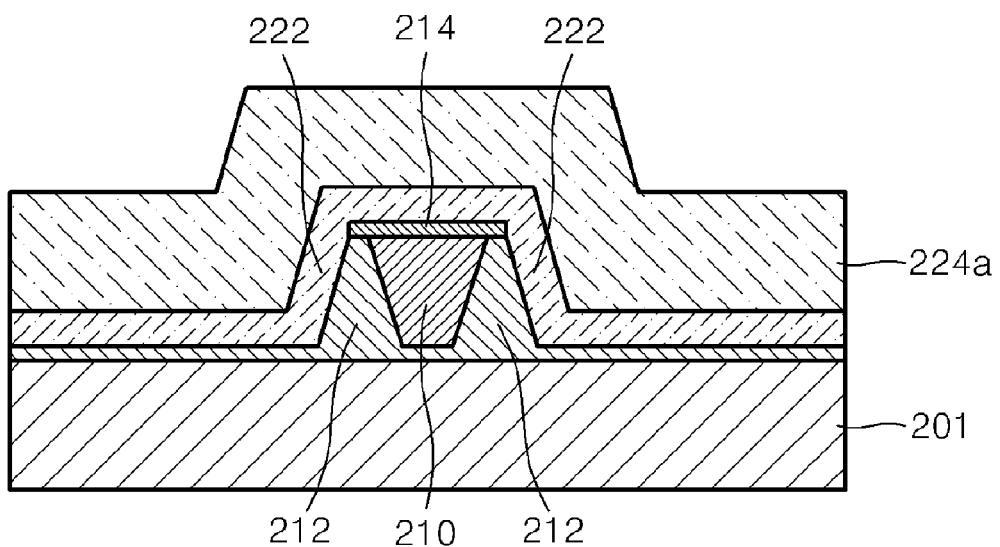

Referring to FIG. 12, the nonmagnetic insulation material layer 224a is formed by coating the surface of the shell type side shield 222 with a nonmagnetic insulation material, for example, $Al_2O_3$, $SiO_2$, or $Si_3N_4$, to a predetermined thickness.

Figure 13:
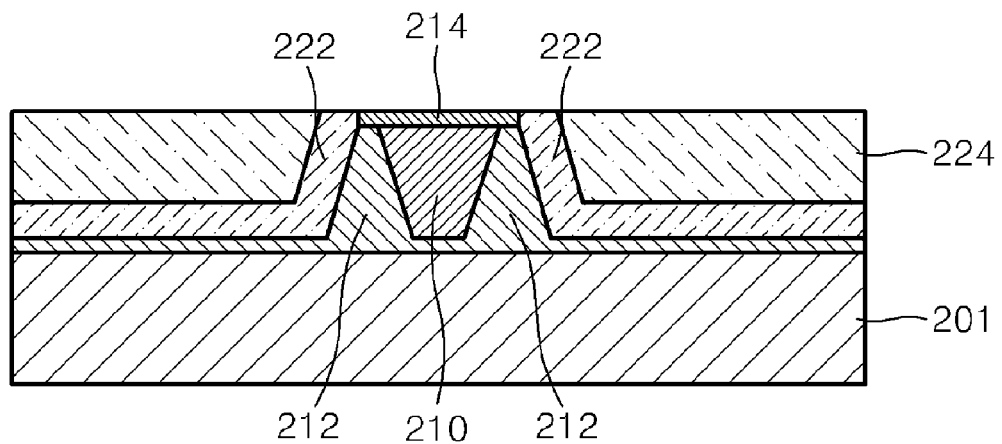

Next, as shown in FIG. 13, the surface of the nonmagnetic material layer 224a is grinded to be flat by using the CMP process until sections of the shell type side shield 222 and the second gap layer 214 are exposed, and thus, reduce the thickness of the nonmagnetic material layer 224a. Thus, the remaining portion of the nonmagnetic material layer 224a forms the shield gap layer 224. The nonmagnetic insulation material layer 224a may remain on the second gap layer 214 to a slight thickness.

Figure 14:
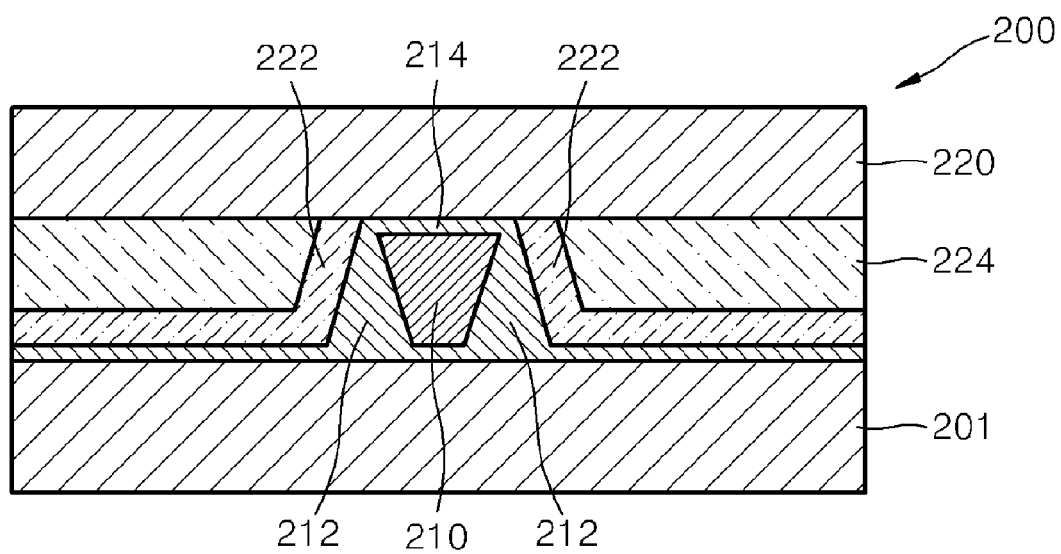

As shown in FIG. 14, the return yoke 220 is formed by coating a magnetic material to on the surface of the shield gap layer 224, the exposed section of the shell type side shield 222, and the exposed surface of the second gap layer 214 to a predetermined thickness. In detail, the magnetic material can be formed of a soft magnetic material, for example, NiFe or NiCoFe and coated in a plating process using a seed layer.

Then, as shown in FIG. 14, the main pole 210 is surrounded by the shell type side shield 222 that is connected to the return yoke 220. Therefore, this results in that the magnetic write head 200 has a structure in which the shell type side shield 222 and the return yoke 220 are separated from each other by the shield gap layer 224, except for the connection area between the return yoke 220 and the shell type side shield 222.

While this invention has been particularly shown and described with reference to exemplary embodiments thereof, it will be understood by one skilled in the art that various changes in form and details may be made therein without departing from the spirit and scope of the invention as defined by the appended claims.

What is claimed is:

1. A magnetic write head comprising:
a main pole with a leading edge and a trailing edge opposite the leading edge;
a return yoke which forms a magnetic path with the main pole;
a side shield which is disposed at opposing sides of the main pole; and
a shield gap layer which is interposed between the side shield and the return yoke,
wherein the distance between the side shield and the main pole is smaller at the trailing edge of the main pole than at the leading edge of the main pole;
wherein a portion of the side shield and a portion of the return yoke contact each other, and the side shield and the return yoke are separated from each other by the shield gap layer in an area except for the portion of the side shield and the portion of the return yoke which contact each other.

2. The magnetic write head of claim 1, wherein a thickness of the side shield is less than a thickness of the shield gap layer.

3. The magnetic write head of claim 1, wherein a first gap layer is interposed between the opposing sides of the main pole and the side shield and comprises a nonmagnetic insulation material.

4. The magnetic write head of claim 3, wherein a gap exists between an end portion of the main pole and an end portion of the return yoke, and a second gap layer is disposed in the gap and comprises a nonmagnetic insulation material.

5. The magnetic write head of claim 1, wherein each of the main pole, the return yoke, and the side shield comprises a magnetic material.

6. The magnetic write head of claim 1, wherein the shield gap layer comprises a nonmagnetic insulation material.

7. The magnetic write head of claim 1, wherein the end portions of the side shield which are connected to the return yoke have a thickness which is the same as a thickness of the side shield.

8. The magnetic write head of claim 1, wherein:
the return yoke is located closer to the trailing edge of the main pole than the leading edge of the main pole; and
a thickness of the side shield is less than a thickness of the shield gap layer.

9. The magnetic write head of claim 1, wherein the side shield is interposed between the main pole the shield gap layer.

10. A magnetic recording apparatus comprising:
a main pole with a leading edge and a trailing edge opposite the leading edge;
a return yoke which forms a magnetic path with the main pole;
a side shield which is formed of a soft magnetic material and disposed on at least two opposing sides of the main pole, the side shield having end portions which contact the return yoke;
a gap layer which is formed of a nonmagnetic material and is interposed between the side shield and the two opposing sides of the main pole;
a shield gap layer which is formed of a nonmagnetic material and interposed between portions of the side shield and portions of the return yoke;
wherein the distance between the side shield and the main pole is smaller at the trailing edge of the main pole than at the leading edge of the main pole.

11. The magnetic recording apparatus of claim 10, wherein the shield gap layer comprises:
a first gap layer interposed between the portions of the side shield and the two opposing sides of the main pole; and
a second gap layer interposed between the main pole and the return yoke, the first and second gap layers being connected to the first gap layer.

12. The magnetic recording apparatus of claim 11, wherein a thickness of the side shield is less than a thickness of the shield gap layer.

13. The magnetic recording apparatus of claim 12, wherein the side shield comprises first portions which extend away from the opposing sides of the main pole, and second portions which extend along a length of opposing sides of the main pole.

14. The magnetic recording apparatus of claim 11 further comprising a sub-yoke which is arranged at a side of the main pole and concentrates magnetic flux at an end portion of the main pole.

15. The magnetic recording apparatus of claim 11, wherein the end portions of the side shield which are connected to the return yoke have a thickness which is the same as a thickness of the side shield.

16. The magnetic recording apparatus of claim 10, wherein:
the return yoke is located closer to the trailing edge of the main pole than the leading edge of the main pole; and
a thickness of the side shield is less than a thickness of the shield gap layer.

17. The magnetic recording apparatus of claim 10, wherein the side shield is interposed between the main pole the shield gap layer.

* * * * *